(12) United States Patent
Howlett et al.

(10) Patent No.: US 8,499,328 B2
(45) Date of Patent: Jul. 30, 2013

(54) AGILE DISTORTION AND NOISE CANCELLATION ACROSS MULTIPLE CHANNELS AND PORTS IN A CATV UPCONVERTER/MODULATOR

(75) Inventors: Colin Howlett, Victoria (CA); Gerald Harron, Martensville (CA); Michael Jaspar, Victoria (CA)

(73) Assignee: Vecima Networks Inc., Victoria, BC (CA)

( * ) Notice: Subject to any disclaimer, the term of this patent is extended or adjusted under 35 U.S.C. 154(b) by 432 days.

(21) Appl. No.: 13/016,169

(22) Filed: Jan. 28, 2011

(65) Prior Publication Data
US 2011/0191815 A1    Aug. 4, 2011

Related U.S. Application Data

(60) Provisional application No. 61/300,690, filed on Feb. 2, 2010.

(51) Int. Cl.
*H04N 7/16* (2011.01)

(52) U.S. Cl.
USPC ........... 725/144; 725/149; 725/148; 725/147; 375/296

(58) Field of Classification Search
USPC .................................................. 725/149, 144
See application file for complete search history.

(56) References Cited

U.S. PATENT DOCUMENTS

| | | | |
|---|---|---|---|
| 6,054,894 A * | 4/2000 | Wright et al. ................. | 330/149 |
| 7,065,330 B2 * | 6/2006 | Klingberg et al. ............ | 455/126 |
| 2009/0184763 A1 * | 7/2009 | Kim .......................... | 330/124 R |
| 2011/0150130 A1 * | 6/2011 | Kenington .................... | 375/296 |

* cited by examiner

*Primary Examiner* — Robert Hance
(74) *Attorney, Agent, or Firm* — Adrian D. Battison; Ade & Company Inc.

(57) ABSTRACT

A distortion-cancellation method for analog CATV or QAM transmission over cable is provided wherein a single feedback path from the output of a multiple-channel multiple-port upconverter/modulator is down-converted and used to reduce or cancel undesirable noise components including LO leakage, spurious, and modulated noise. The method allows for real-time monitoring, tuning, or control of the CATV/QAM output and of interfering signals and aging effects as compared to a desired performance metric.

10 Claims, 2 Drawing Sheets

AGILE DISTORTION AND NOISE CANCELLATION ACROSS MULTIPLE CHANNELS AND PORTS IN A CATV UPCONVERTER/MODULATOR

This application claims the benefit under 35 USC 119 of the priority of Provisional Application No. 61/300,690 filed Feb. 2, 2010, the disclosure of which is incorporated herein by reference.

This invention relates to an agile distortion and noise cancellation across multiple channels and ports in a CATV upconverter/modulator. The invention can be applied to both QAM modulated signals and analog modulated signals such as NTSC, PAL etc.

BACKGROUND OF THE INVENTION

Details of the CATV modulator are well known to persons skilled in this art and can be located from many prior documents describing the operation of these arrangements. Extensive details are available in the Technical Reports available from Cable Television Laboratories Inc and particularly the reports entitled Data-Over Cable Service Interface Specifications Modular Headend Architecture which is CM-TR-MHA-V02-081209 copyright 2008; and Data-Over Cable Service Interface Specifications which is CM-TR-CMAP-V01-101222 copyright 2010.

These documents are published and available on line from their web site at Cablelabs.com. The disclosure of the above documents is hereby incorporated by reference.

Present designs often employ an open-loop system of calibration or control in order to optimize the signal quality of an analog CATV or QAM output or to eliminate interfering signals from the output signal. This approach suffers from an inability to adapt to longer term effects such as aging or changes in non-linear characteristics. Aging effects are changes in the operating parameters of electronic components over time. For example, oscillators' output frequencies may drift and amplifiers' gain and distortion products may change over time.

A common application of a dedicated closed-loop feedback path in transmitter hardware is to pre-distort for the effects of amplifier non-linearity. These systems are implemented as a single feedback path per output port and do not allow for the real-time monitoring, tuning, or control of other interfering distortions or the CATV/QAM channel characteristics. In addition, these systems do not allow for the isolation of individual channel or frequency-band-specific information.

SUMMARY OF THE INVENTION

According to the invention there is provided an apparatus for signal modulation for transmission on a CATV cable comprising:

a plurality of ports for receiving input data;

each port having associated therewith a respective one of a plurality of signal generators each arranged for generating from the input data signals to be transmitted on the CATV cable to recipients;

each generator including a pre-distortion component for applying a distortion to the signals to effect cancellation of distortion and noise arising in the CATV cable between the modulation and the recipient;

each generator being associated with a respective one of a plurality of upconversion paths, where each upconversion path includes an output for transmission on the cable;

a plurality of monitoring points defined in the plurality of upconversion paths;

a single feedback path;

a time division multiplexer arranged to switch the single feedback path between the plurality of monitoring points;

the single feedback path including a downconversion path, for receiving and downconverting the signal from the selected monitoring point, and a signal processing block;

the signal processing block being arranged to analyze the signal from the downconversion path and create real-time pre-distortion and noise cancellation data for use in the pre-distortion component of the signal generator.

Preferably the plurality of monitoring points include the output ports of the multiple upconversion paths and/or intermediate stages along each of the upconversion paths.

Preferably herein with the downconversion path includes flexible tuning and filtering bandwidths and an analog-to-digital conversion.

Preferably the time division multiplexer is arranged such that the switching of the feedback signal is intelligently controlled by the signal processing module to periodically select each monitoring point.

Preferably the time division multiplexer is arranged such that each monitoring point is selected as often as is needed to achieve the desired distortion and noise cancellation.

Preferably the need is determined according to one or more of the following intelligent criteria:

the number and type of distortions, noise components, and interfering signals;

the analysis time required to address each where the multiplexer has selected a specific monitoring point;

the frequency where each distortion, noise component, and interfering signal must be analyzed.

Preferably the need is determined according to other parameters as required to meet desired upconverter/modulator performance targets.

Preferably the signal processing block is arranged to reduce or eliminate local oscillator leakage, spurs, noise, linearity, etc by analysis of amplitude or phase information in the feedback waveform provided by the downconversion path to produce a pre-distortion signal or set of parameters.

Preferably information on aging effects is gathered by periodically polling each monitoring point for data.

Preferably the signals are QAM modulated signals or analogue modulated signals.

This invention therefore presents a versatile closed-loop feedback system. A single feedback path is selectively connected to multiple output ports or connected to points within the upconversion paths of multiple RF chains. Pre-distortion for amplifier linearity, noise, spurious, QAM/CATV fidelity and other distortions is possible versus frequency, temperature, and aging effects.

Information on aging effects can be gathered by periodically polling each monitoring point for data. With each update, the signal processing unit can pass updated pre-distortion parameters to the CATV/QAM generator/processor.

A distortion-cancellation method for CATV or QAM transmission over cable is provided wherein a single feedback path from the output of a multiple-channel multiple-port upconverter/modulator is down-converted and used to reduce or cancel undesirable noise components including LO leakage, spurious, and modulated noise. The method allows for real-time monitoring, tuning, or control of the CATV/QAM output and of interfering signals as compared to a desired performance metric.

DETAILED DESCRIPTION

Figure 1:
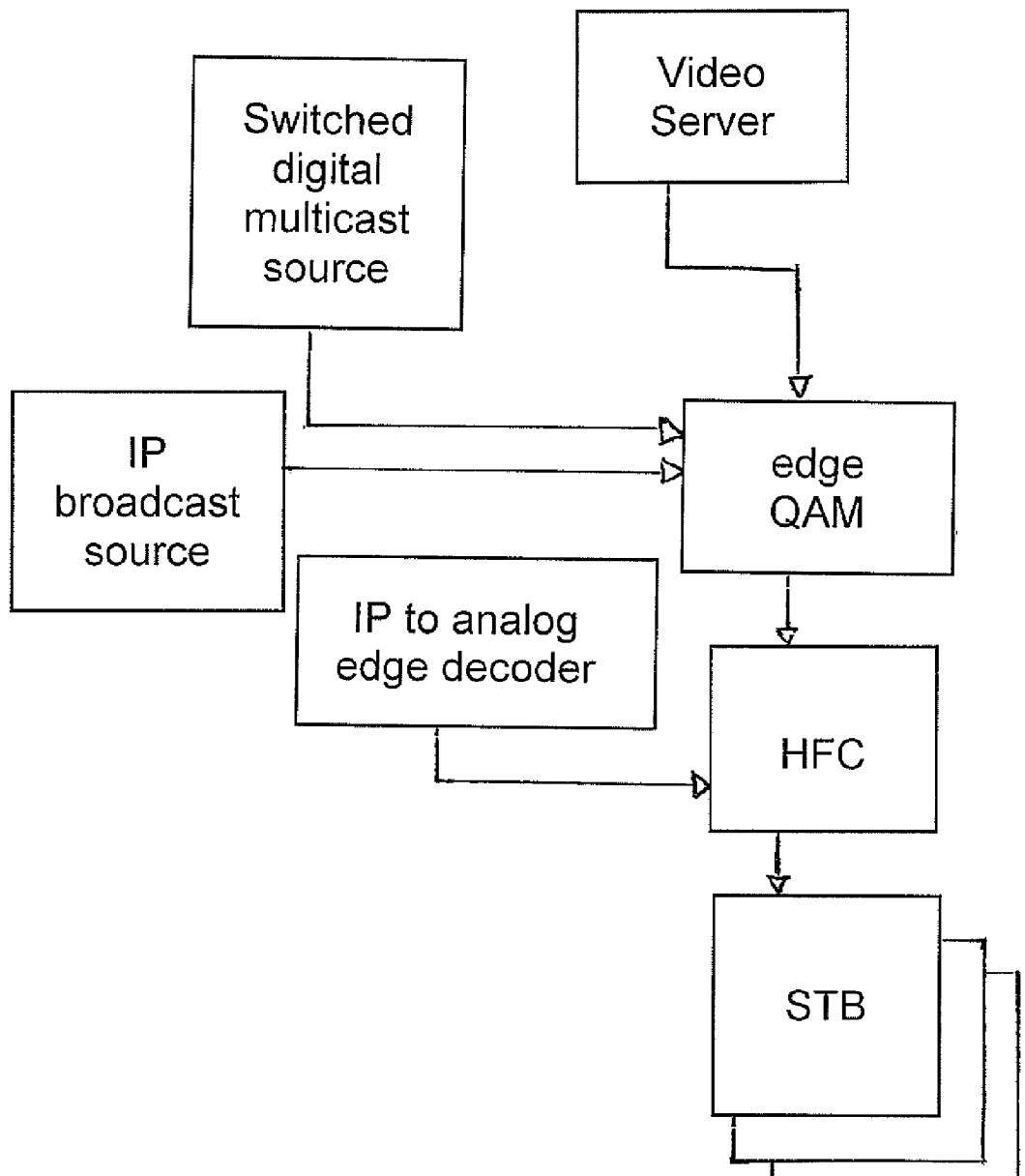
FIG. 1 is a general block diagram of an analog CATV or QAM system such as what would be employed for modulation and upconversion in a cable video headend.

Reference is made to the above documents and particularly FIG. 5-1 of the first document. This shows MPEG, SPTS or MPTS via UDP/IP multiplexed onto MPTS input to mod/upx into the Headend combining HFC (Hybrid fiber-coax) network which serves set-top boxes in customer homes.

FIG. 5-3 M-CMTS reference architecture from the second document provide a similar disclosure.

FIG. 1 is a general block diagram of an analog CATV or QAM system such as what would be employed for modulation and upconversion in a cable video headend. MPEG, SPTS or MPTS are input from a variety of sources. Some are converted to an analog video channel through an edge decoder in the analog CATV case. Others are encoded and mapped to a digital QAM channel in an edge QAM in the QAM case. In either of the edge decoder or edge QAM, channels are upconverted and output onto a combining network for delivery to customer premises.

Figure 2:
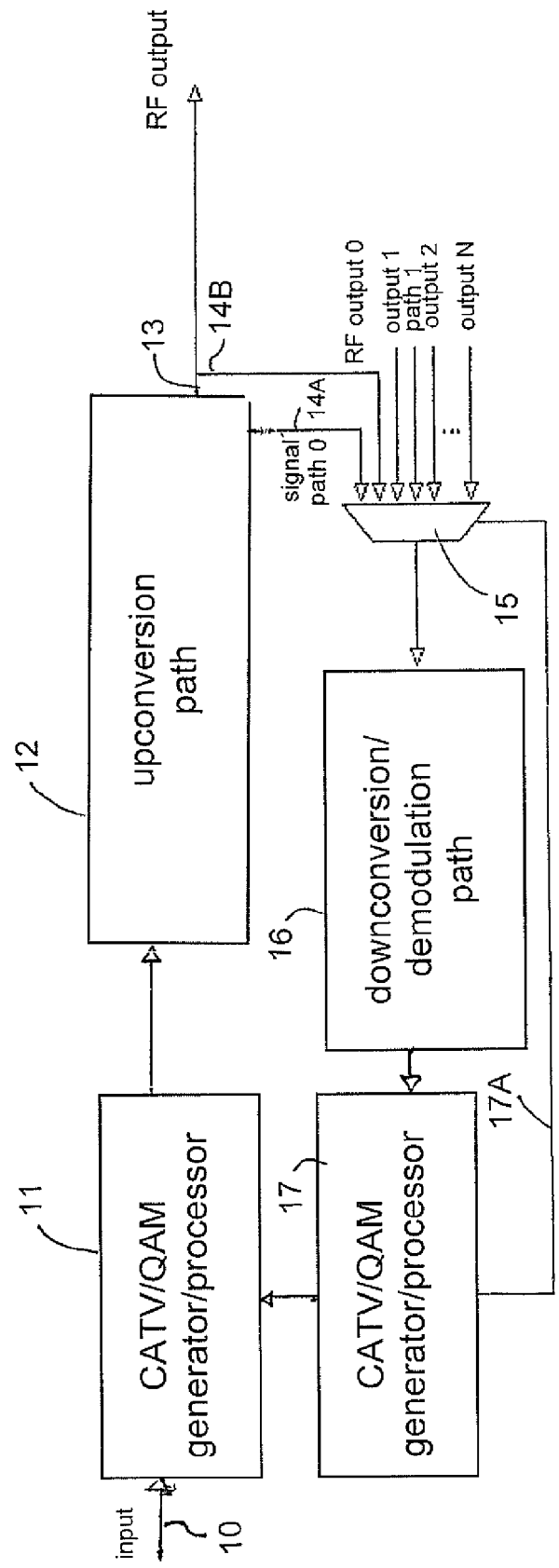
FIG. 2 is a general block diagram of a distortion-cancellation system including feedback signals taken from the outputs or an intermediate stages of a port or ports, down-converted and processed for use by the CATV/QAM generator/processor.

In FIG. 2, the apparatus for signal modulation for transmission on a CATV cable includes a plurality of ports 10 for receiving input data each port having associated therewith a respective one of a plurality of signal generators 11 each arranged for generating from the input data signals to be transmitted on the CATV cable to recipients. Each generator includes, as is generally known, a pre-distortion component for applying a distortion to the signals to effect cancellation of distortion and noise arising in the CATV cable between the modulation and the recipient. Each generator is associated with a respective one of a plurality of upconversion paths 12 where each upconversion path includes an output 13 for transmission on the cable. A plurality of monitoring points 14A, 14B etc are defined in the plurality of upconversion paths 12. A single feedback path includes a time division multiplexer 15 arranged to switch the single feedback path between the plurality of monitoring points 14A, 14B etc. The single feedback path includes a downconversion path 16 for receiving and downconverting the signal from the selected monitoring point, and a signal processing block 17. The signal processing block 17 is arranged to analyze the signal from the downconversion path and create real-time pre-distortion and noise cancellation data for use in the pre-distortion component of the signal generator.

The plurality of monitoring points include the output ports of the multiple upconversion paths and/or intermediate stages along each of the upconversion paths.

The downconversion path 16 includes flexible tuning and filtering bandwidths and an analog-to-digital conversion.

The time division multiplexer 15 is controlled by the processor 17 though a link 17A such that the switching of the feedback signal is intelligently controlled by the signal processing module to periodically select each monitoring point.

The time division multiplexer is arranged such that each monitoring point is selected as often as is needed to achieve the desired distortion and noise cancellation.

The signal processing block 17 is arranged to reduce or eliminate local oscillator leakage, spurs, noise, linearity, etc by analysis of amplitude or phase information in the feedback waveform provided by the downconversion path to produce a pre-distortion signal or set of parameters.

Information on aging effects is gathered by periodically polling each monitoring point for data.

Thus a single down-conversion path 16 switches between multiple closed-loop feedback paths 0 to N. In this way, a single processing path 16 may analyze multiple distortions or characteristics across multiple ports at outputs 0 to N sampled one at a time.

The CATV/QAM generator/processor block 11 applies the pre-distortion parameters calculated or derived within the signal processing to algorithms acting on individual or groups of CATV/QAM channels to reduce or eliminate distortions. The pre-distortion parameters may also be used to generate unique signals that can be used to cancel noise or spurious interfering signals.

The downconversion path contains many functions including flexible tuning, by means of real or complex mixing the monitoring signal with a carrier of variable frequency, filtering of variable bandwidths to isolate distortion, noise components, or interfering signals, analog to digital conversion to enable analysis of the feedback signal in the digital domain of the signal processing module.

The down-conversion path feeds a signal processing unit which analyzes the feedback signals and produces control or pre-distortion information. This information is input to the appropriate CATV/QAM signal generation/processing module and is used to improve the relevant signal characteristics of a specific port.

The multiplexing/switch function 15 is used to gather signals from throughout the upconversion paths and outputs of multiple ports. The multiplex/switch supplies the down-conversion path with the connection required for the specific pre-distortion required at a given time. The signal processing module, designed to correct for particular kinds of distortion and noise, intelligently controls the feedback multiplexer. The switching from one monitoring point to another is not necessarily periodic, that is each monitoring point does not necessarily receive the same attention from the downconversion path and signal processing module. Monitoring of specific monitoring points is scheduled by the processing module to suit the needs of each specific distortion, noise component, or interfering signal. Scheduling occurs within a time budget that is defined by:

the number of distortions, noise components, and interfering signals;

the analysis time required to address each where the multiplexer has selected a specific monitoring point;

the frequency where each distortion, noise component, and interfering signal must be analyzed; or other parameters as required to meet desired upconverter/modulator performance targets.

In order to correct for an interfering signal such as local oscillator leakage, the signal processing module selects an RF output or equivalent monitoring point through the multiplexer 15. The downconversion path tunes to the frequency of the leakage such that a representation of the amplitude of the leakage can be analyzed by the signal processing module. The signal processing module calculates parameters for a suitable pre-distortion signal and feeds that information to the generator module so as to manipulate the RF output signal and reduce or eliminate the local oscillator leakage.

A similar process allows for the reduction of distortion components and noise where the downconversion path tunes to a frequency of interest and the signal processing module analyzes amplitude or phase information in the feedback waveform to produce a pre-distortion signal or set of parameters.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. Apparatus for signal modulation for transmission on a CATV cable comprising:
   a plurality of ports for receiving input data;
   each port having associated therewith a respective one of a plurality of signal generators each arranged for generating from the input data signals to be transmitted on the CATV cable to recipients;
   each generator including a pre-distortion component for applying a distortion to the signals to effect cancellation of distortion and noise arising in the CATV cable between the modulation and the recipient;
   each generator being associated with a respective one of a plurality of upconversion paths, where each upconversion path includes an output for transmission on the cable;
   a plurality of monitoring points defined in each of the plurality of upconversion paths;
   a single feedback path;
   a time division multiplexer arranged to switch the single feedback path between the plurality of monitoring points;
   the single feedback path including a downconversion path, for receiving and downconverting the signal from the selected monitoring point, and a signal processing block;
   the signal processing block being arranged to analyze the signal from the downconversion path and create real-time pre-distortion and noise cancellation data for use in the pre-distortion component of the signal generator.

2. The apparatus according to claim 1 wherein the plurality of monitoring points include the output ports of the multiple upconversion paths and/or intermediate stages along each of the upconversion paths.

3. The apparatus according to claim 1 wherein with the downconversion path includes flexible tuning and filtering bandwidths and an analog-to-digital conversion.

4. The apparatus according to claim 1 wherein the time division multiplexer is arranged such that the switching of the feedback signal is intelligently controlled by the signal processing module to periodically select each monitoring point.

5. The apparatus according to claim 1 wherein the time division multiplexer is arranged such that each monitoring point is selected as often as is needed to achieve the desired distortion and noise cancellation.

6. The apparatus according to claim 5 wherein the need is determined according to one or more of the following intelligent criteria:
   the number and type of distortions, noise components, and interfering signals;
   the analysis time required to address each where the multiplexer has selected a specific monitoring point;
   the frequency where each distortion, noise component, and interfering signal must be analyzed.

7. The apparatus according to claim 5 wherein the need is determined according to other parameters as required to meet desired upconverter/modulator performance targets.

8. The apparatus according to claim 1 wherein the signal processing block is arranged to reduce or eliminate local oscillator leakage, spurs, noise, and linearity by analysis of amplitude or phase information in the feedback waveform provided by the downconversion path to produce a pre-distortion signal or set of parameters.

9. The apparatus according to claim 1 wherein Information on aging effects is gathered by periodically polling each monitoring point for data.

10. The apparatus according to claim 1 wherein the signals are QAM modulated signals or analogue modulated signals.

* * * * *